Feb. 21, 1933.                A. OLSEN, JR., ET AL                1,898,208
CANDY BOX
Filed March 23, 1931
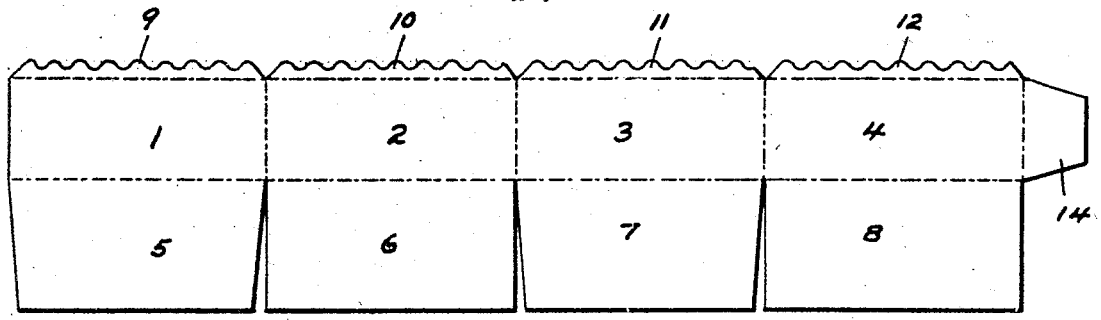
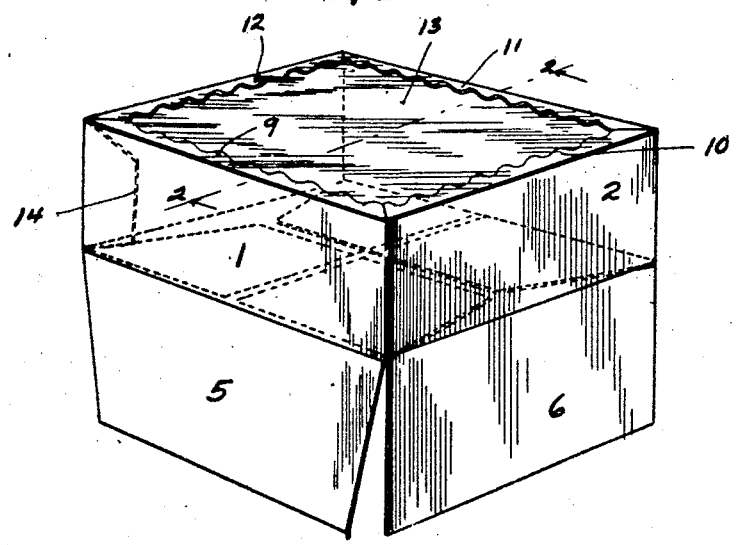
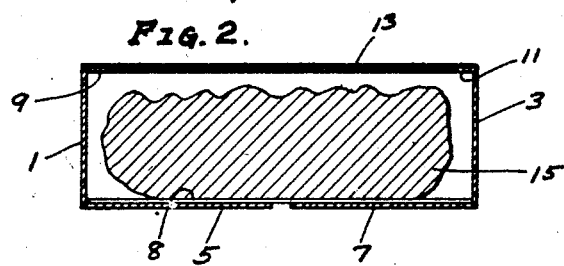
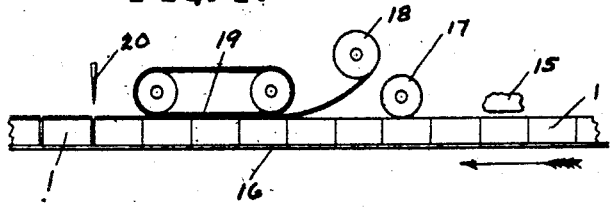
INVENTORS
Andrew Olsen Jr.
Reed W. Robinson
BY
ATTORNEYS.

Patented Feb. 21, 1933

1,898,208

UNITED STATES PATENT OFFICE

ANDREW OLSEN, JR., AND REED W. ROBINSON, OF SAN FRANCISCO, CALIFORNIA

CANDY BOX

Application filed March 23, 1931. Serial No. 524,554.

This invention relates to candy boxes and has for its main object an improved box particularly suitable for the smaller packages of candy such as sell for five and ten cents on the stands. Other objects are ease and cheapness of manufacture while gaining the advantages of much more expensive construction. Another object is an unusually attractive appearance tending to promote sales.

In the drawing accompanying this application Fig. 1 is a perspective view of our improved box, as completed, ready for insertion of the candy from the under side.

Fig. 2 is a cross section of the box as seen from the line 2—2 of Fig. 1 but with lower flaps closed and sealed and the candy in place.

Fig. 3 is a development plan of the cardboard blank from which the box is made.

Fig. 4 is a diagrammatic view showing the manner of attaching the transparent cover to the boxes.

In further detail the box comprises side walls 1, 2, 3, 4, lower flaps 5, 6, 7, 8, and upper inwardly extending margins 9, 10, 11, 12, preferably provided with a scalloped edge as shown, and pasted to the outer surface of which margins is a sheet of glassine paper or cellophane 13.

The box in blank or unfolded form consists of a long strip as shown in Fig. 3 scored along the dotted lines dividing the members designated and also provided with a side wall joining tongue 14, which when the strip or blank is folded is pasted to the inner surface of side 1 and constitutes the only joint in the body of the box.

After the box is formed as explained, the cellophane is glued to the scalloped margin by one of two methods. If under small production, the boxes are taken one by one and pressed margin edge down upon a pad of hot glue and then at once transferred and pressed down upon an aligned stack of cut cellophane sheets so as to pick up one from the pile, suitable guides being provided to align the box with the sheets. After the cellophane sheet is thus attached the candy 15 is inserted from below and the flaps 5, 6, 7 and 8 folded in to the position indicated by the dotted lines in Fig. 1 and the two outer ones sealed with glue or the like.

If a large production is under way the boxes are first closed below and sealed and passed along as on a conveyor 16 in Fig. 4 while the candies are dropped in from above, gluing roller 17 is rolled over the margins of the box, a roll of cellophane 18 of proper width is unrolled over the boxes to adhere to the glued margins, a holding-down belt 19 travels upon the cellophane for a distance to insure firm adherence to the box, and a knife 20 descends or passes at timed intervals between the boxes to cut the cellophane sheet.

In considering this invention attention is called to the fact that this box is completely formed from a plain notched strip as shown in Fig. 3 and it entirely avoids any cut-out or died-out window or opening in a solid sheet which is so wasteful and expensive as to be prohibitive in candy boxes where a fraction of a cent means success or failure, nor must it be confused with what is termed a "set up box" all completed at the factory, as this invention is to supply a folding box in flat scored strips ready for the candy packer to fold into box form with the simplest of operations. But notwithstanding the cheapness of the construction shown it forms an attractive box for the purpose intended.

The simplicity of attaching the cellophane to the outer inwardly turned margins of the side walls, and scalloping this to present a finished edge, are also considered important features in the construction, which, though in a restricted field, are nevertheless points of relatively great value.

Our use of the words "cellophane" or "glassine" herein is intended to cover any transparent sheet material suitable for gumming to the inwardly turned margins of the box, and the word "glued" in the claims is intended to cover any similar form of attaching.

We therefore claim:—

1. A folding box provided with four side walls, inwardly turned margins at the upper edges of the side walls, and closing flaps at the lower edges, the junctures of all parts being scored, and a sheet of glassine material glued across the top of the box to said margins.

2. A folding box provided with four side walls, inwardly turned margins at the upper edges of the side walls, and closing flaps at the lower edges, the junctures of all parts being scored, and a sheet of glassine material glued across the top of the box to the outer surface of said margins.

3. A folding box provided with four side walls, inwardly turned margins at the upper edges of the side walls, closing flaps at the lower edges all formed on a single sheet, the junctures of all parts being scored, and a sheet of glassine material glued across the top of the box to said margins.

4. A folding box provided with four side walls, inwardly turned margins at the upper edges of the side walls, closing flaps at the lower edges of the side walls, a body joining tongue extending from one side wall to the next, and a sheet of cellophane glued to the outer side of said margins.

ANDREW OLSEN, Jr.
REED W. ROBINSON.